United States Patent [19]

Drexhage et al.

[11] 3,781,711

[45] Dec. 25, 1973

[54] LASER DYE COMPOSITION

[75] Inventors: Karl H. Drexhage; George A. Reynolds, both of Rochester, N.Y.

[73] Assignee: Eastman Kodak Company, Rochester, N.Y.

[22] Filed: Oct. 16, 1972

[21] Appl. No.: 298,057

[52] U.S. Cl. .................................. 331/94.5, 330/4.3
[51] Int. Cl. .............................................. H01s 3/20
[58] Field of Search ..................... 331/94.5; 330/4.3

[56] References Cited
OTHER PUBLICATIONS

Stepanov et al., Lasers Based on Solutions of Organic Dyes, Soviet Physics Uspekhi, Vol. 11, No. 3 (Nov.–Dec. 1968) pp. 304–318

Giuliani, Saturable Absorption and Q–Switching in a Triphenylmethane Dye, J. Appl. Phys., Vol. 43, No. 3 (March 1972) pp. 1290–1291

*Primary Examiner*—William L. Sikes
*Attorney*—Robert W. Hampton et al.

[57] ABSTRACT

This invention relates to the use of rigidized di- and tripehnyl methane dyes, as well as the aza derivatives thereof as lasing media in liquid dye lasers. Lasing media containing certain of these dyes have advantageously been found to lase in the red and near infrared region of the electromagnetic spectrum.

8 Claims, No Drawings

LASER DYE COMPOSITION

FIELD OF THE INVENTION

This invention relates to lasers and more particularly to the use of a certain class of dyes as lasing media for organic dye lasers.

DESCRIPTION OF THE PRIOR ART

Many of the materials discovered thus far which are capable of acting as lasing media have been in the solid or gaseous state. Solid lasers typically sufer from such disadvantages as cracking and optical imperfections. It is also known that certain organic dyes in solution can operate as "liquid" or "organic dye" lasers. Of the range of materials useful as lasing media, organic lasing dyes provide certain advantages. A wide range of organic dye lasers is available to provide stimulated emission (lasing) over a broad range of the spectrum. Secondly, organic dye lasers are generally capable of being tuned to emit over a range of wavelengths, this being in contradistinction to the essentially single wavelength capability of lasing emission characterizing gas and solid lasers. Thirdly, organic dye lasers provide an economical lasing medium when compared to gas and solid lasers, and they do not suffer from disadvantages such as cracking and optical imperfections that are particularly associated with solid lasers.

The ability to selectively tune organic dye lasers derives from the broad band fluorescence characteristic of the component dye. Such lasers can be "tuned" to emit at wavelengths along substantially the entire fluorescence band of the dye by interposing a dispersive element such as a diffraction grating or a prism.

The operation of a laser is achieved as a result of the phenomenon that excited atoms or molecules can emit a photon or quantum of light, which photon or quantum can itself trigger another excited atom or molecule to emit its photon prematurely. This process is designated stimulated emission.

The excitation of organic lasing dyes can be achieved by subjecting the dye, under controlled conditions such as will be described herein, to a suitable source of energy such as bombarding it with electrons or illuminating it with a high energy source. Conventionally, illumination is utilized for liquid laser materials. Excitation of a liquid laser medium by illumination is generally termed "optical pumping" or merely "pumping." Pumping sources include, for example, sources such as giant pulse lasers, xenon and argon arc flash tubes as well as arc discharge tubes containing only air or other gaseous mixtures.

Various arrangements of laser apparatus can be used. A laser structure particularly adapted for organic dye liquid laser media is described by Sorokin et al, IBM Journal, V. 11, p. 148 (1967). Advantageous laser apparatus structures usually include an optically resonant cavity containing a reservoir of a liquid laser medium or a liquid laser body disposed within a thin-walled quartz cylinder. Typically, the reservoir is part of a closed system through which the dye solution is circulated during lasing operation. Thus, local heating which can cause refractive index discontinuities and potential breakdown of the dye is effectively prevented. To provide an energy source for exciting the atoms of the laser material, the laser body can be surrounded concentrically by a lamp, such as one containing an annular region with an outer thick-walled quartz cylinder. The annular region can contain an air-region mixture and have electrodes which are operably connected to a low inductance capacitor charged by a standard high voltage supply. Desirably, coaxially disposed at either end of the optically resonant cavity are opposed internally reflective cavity ends such as mirrors.

When optical pumping is used, the light source emits light having wavelengths within at least one absorption band of the lasing medium. The absorbed light causes molecular electrons in the medium to shift in energy level. Molecular electrons exist either in a singlet state (two electrons spinning in opposite directions) or a triplet (two electrons spinning in the same direction). The ground state is the unexcited state for molecular electrons and has the lowest energy. Typically, the ground state in almost all molecules in a singlet (designated $S^0$), one of many possible energy levels in the signlet manifold. When the pumping source is activated, the resultant light pulse enters the laser body and photons of energy of appropriate absorptive wavelength are absorbed by active molecules in the body and cause the electrons of such molecules to shift from an initial low energy level ($S^0$) to a high energy level from which emissive transition occurs.

In operation, the molecular electrons of the laser medium are "pumped" to higher excited states of the singlet system by intense energy inputs. It is thought that they then first undergo transitions from such excited states to the lowest excited singlet state (designated $S^1$). After diminishing in energy level to the lowest excited singlet, the molecule can relinquish its remaining excess energy radiatively or non-radiatively from $S^1$ to $S^0$, non-radiatively from $S^1$ to a triplet state and then radiatively or non-radiatively from the lowest excited triplet state to $S^0$. Generally, laser emission consists of optical emission resulting from transitions from $S^1$ to various vibrational modes of $S^0$. Susceptibility to triplet formation upon pumping is deleterious due to typical non-radiative energy losses resulting from triplet to $S^0$ transitions. Also, if there is significant overlap between the triplet absorption and either the pump bands or lasing emission bands, laser action generally will be impeded or will fail entirely. Additionally, advantageous laser emission can occur only when the population of molecules established at this higher energy level in the laser body by such light pumping exceeds the population of molecules at the low energy level, a condition conventionally designated "population inversion" or "inversion of energy states."

Upon reaching an inversion of energy states, individual molecules of the high energy level population undergo emissive transition spontaneously, shifting to a terminal low energy level as described herein with a concomitant emission of light. A portion of the spontaneously emitted light is usually reflected back and forth through a resonant optical cavity structure, such as previously described, between its internally reflective ends. As this light passes through the laser body in multiple bidirectional reflections, it induces other molecules of the enlarged high energy level population to undergo premature light emissive transitions as noted herein. This produces more light, which augments the bidirectionally reflected light in the cavity to induce still further light emissive transitions. A rising pulse of bidirectionally reflected light quickly develops in the cavity, reaching a quantitatively large value as the induced emissive transition of molecules from the high energy level population increases. If one of the reflective cavity ends is partially transmissive, as is typically the case, a portion of the intense reflected light pulse passes through the one end and out of the cavity to constitute the laser output light pulse of the laser beam.

As mentioned previously, organic dye lasers have many advantages over solid or gas lasers. The choice of a particular class of organic dye for use in an organic dye laser generally depends upon the wavelength of lasing desired and the availability of organic dyes known to lase in this area of the spectrum. As is well known, many organic dyes do not lase at all. For example, di- and triphenyl methane dyes as well as the aza derivatives do not lase at any wavelength. As is also known, among those classes of organic dyes which do lase, at the present time there are relatively few organic dyes available which are known to lase in the red and near infrared area of the spectrum.

SUMMARY OF THE INVENTION

In accord with the present invention it has been discovered that rigidized di- and triphenyl methane dyes as well as the aza-derivatives thereof are useful as lasing media in liquid dye lasers. This class of dyes has been found particularly useful because many of the dyes in this class lase in the red and near infrared region of the electromagnetic spectrum, i.e., from about 600 nm. to about 800 nm. At the present time there are very few known dyes which will lase effectively in this region of the spectrum. The fact that many of the dyes useful in the present invention will lase in a region of the spectrum where few other dyes are known to lase is not only advantageous but also somewhat surprising since the related non-rigidized di- and triphenyl methane dyes and aza-derivatives thereof do not fluoresce and will not lase at all.

DESCRIPTION OF PREFERRED EMBODIMENTS

The present invention is implemented through the use, with dye lasers having a reservoir means containing a laser dye solution and a pumping energy source capable of producing stimulated emission of the solution which comprises a lasing concentration of dye in a non-interfering solvent (i.e., one that does not inhibit stimulated emission), or a di- or triphenyl methane dye or the aza-derivative thereof which is rigidized by a saturated carbon atom bridge.

Typical of the above-described dyes useful in the present invention are rigidized di-phenyl and triphenyl methane dyes, as well as the aza-derivatives thereof, having the formula

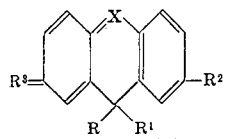

wherein X represents a nitrogen atom or the group

$R^4$ representing (1) hydrogen; (2) a lower alkyl radical, for example an alkyl radical having 1 to about 10 carbon atoms and including a substituted alkyl radical having such substituents as (a) hydroxy, (b) unsubstituted lower alkoxy radicals having up to about 10 carbon atoms, (c) carboxy radicals ($-COOR^5$) where $R^5$ is hydrogen, an unsubstituted lower alkyl radical, or a metal, and (d) sulfo radicals ($-SO_3R^6$) where $R^6$ is hydrogen, an unsubstituted lower alkyl radical, or a metal, (e) and the like; (3) an aryl radical such as mono- and polycyclic aryl radicals having six to 14 atoms in the nucleus, such as phenyl, p-tolyl, naphthyl, anthryl, etc., including substituted aryl radicals having such substituents as hydroxy radicals, unsubstituted lower alkoxy radicals, carboxy radicals, sulfo radicals, lower alkyl radicals, and the like (all as defined hereinabove); or (4) a lower alkoxy radical having 1 to about 10 carbon atoms including a substituted alkoxy radical having a hydroxy, carboxy, sulfo, lower alkyl radical substituent, and the like (all as defined hereinabove);

wherein R and $R^1$, being the same or different, represent hydrogen; an alkyl radical having from one to about 15 carbon atoms and including substituted alkyl radicals having such substituents as noted hereinabove in the case where $R^4$ represents a lower alkyl radical; aryl radicals including substituted aryl radicals as defined hereinabove; and when taken together R and $R^1$ represent the atoms necessary to complete a 6 member carbocyclic ring including a substituted 6 member ring having substituents such as a lower alkyl radical as defined hereinabove, an oxo group, and the like;

wherein $R^3$ is an imino, oxo, thio, or onium salt group such as those having the formula

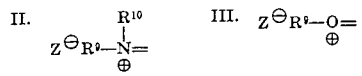

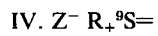

where $R^9$ and $R^{10}$ are hydrogen or lower alkyl radicals as defined hereinabove and where $Z^-$ is an anion;

wherein $R^2$ represents a di-substituted amino radical such as an amino radical having the formula

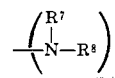

where $R^7$ and $R^8$, which may be the same or different, represent a hydrogen atom or lower alkyl radical as defined hereinabove; hydroxy; or a mercapto group; with the proviso that when $R^3$ represents an imino, oxo, or thio group, $R^2$ represents a moiety having the formula $-T^- Y^+$ where $Y^+$ is a cation and T represents an oxygen (O) or sulfur (S) atom.

A partial list of the wide variety of typical anions from which $Z^-$ may be selected includes chloride, bromide, iodide, persulfate, sulfate, aromatic sulfonates such as p-toluene-sulfonate and benzenesulfonate, acid anions derived from carboxylic acids like acetate, trifluoroacetate, propionate, benzoate, etc. In general any anion may be used as the specific anion selected is not particularly critical.

A partial list of the wide variety of typical cations from which $Y^+$ may be selected includes metals; especially alkali and alkaline earth metals such as sodium, lithium, potassium, rubidium, calcium, strontium, barium, and magnesium; ammonium groups having the formula

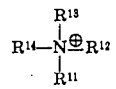

wherein $R^{11}$, $R^{12}$, $R^{13}$, $R^{14}$, being the same or different, represent hydrogen, lower alkyl radicals as defined hereinabove, or aryl radicals as defined hereinabove. In general any cation may be used as the specific cation selected is not particularly critical.

Especially advantageous rigidized dyes useful in the present invention include dyes having formula I above wherein X represents nitrogen and R and $R^1$ taken together represent a 6-member carbocyclic ring, for example, a cyclohexadien-4-one ring, or a substituted 6-member carbocyclic ring having substituents selected from the group consisting of lower alkyl radicals as defined hereinabove.

Another especially useful class of dyes in accordance with the present invention are the dyes of formula I noted above wherein X represents

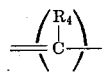

$R^4$ representing hydrogen or a lower alkyl radical as defined hereinabove, wherein $R^3$ is an onium salt having formula II defined hereinabove, and $R^2$ is a disubstituted amino group having the formula

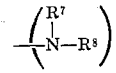

wherein $R^7$ and $R^8$, being the same or different, represent hydrogen or an unsubstituted alkyl radical having one to about three carbon atoms. These dyes described immediately hereinabove are especially useful because they lase in the red and near infrared region of the electromagnetic spectrum. A partial listing of these especially preferred dyes includes (1) salts such as metal or ammonium salts of 7-hydroxy-2', 3', 5', 6'-tetramethylspiro(acridine-9,1'-cyclohexa-2', 5'-diene)-2(9H)-4'-dione, for example, a dye having the formula

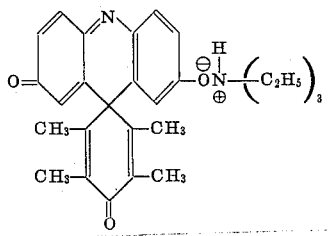

(2) metal or ammonium salts of 7-hydroxy-2'-methyl-5'-isopropylspiro(acridine-9, 1'-cyclohexa-2', 5'-diene)-2(9H)-4'-dione, for example, a dye having the formula

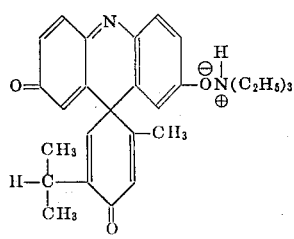

(3) 9,9-dimethyl-2-dimethylamino-7H, 9H-anthracen-7-dimethyliminium nitrate having the formula

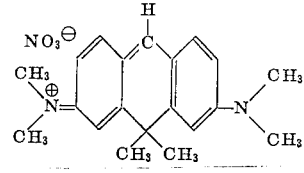

(4) 7-amino-9,9-diphenyl-2(9H)-acridinylideneiminium chloride having the formula

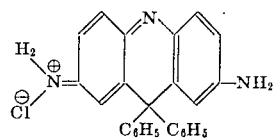

The dyes described herein can be prepared by various known techniques. For example, dyes having formula I shown hereinabove wherein X represents nitrogen may conveniently be obtained by first preparing the unionized dye (ie. the non-salt form of the dye), for example, 7-hydroxy-2',3',5',6'-tetramethylspiro(acridine-9,1'-cyclohexa-2',5'-diene)-2(9H)-4'-dione, by the techniques described by R. Hill et al., Journal of the Chemical Society, part C, (1970), p. 2462. The unionized dye may be conveniently converted to its ionized or salt form by dissolving the dye in a suitable lasing solvent (as described hereinafter in greater detail) containing a small amount of a material capable of forming a salt of the dye in the solvent, for example, a suitable organic base, eg. trialkyl amine or inorganic base, eg. sodium hydroxide. Other dyes useful in the invention, for example, dyes having formula I above wherein X represents the group

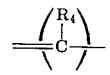

may conveniently be prepared by the techniques described by C. Aaron and C.C. Barker, Journal of the Chemical Society, part III, (1963), p. 2655. Since these dyes, when prepared by the technique described by C. Aaron et al., are already in an ionic or salt form, these dyes may be added directly to a suitable solvent to form a lasing solution, there being no need to add any additional material to the solvent to convert the dye to its ionic or salt form.

As used herein, the term "lasing concentration" refers to a concentration sufficient to promote, under appropriate conditions such as those mentioned herein, stimulated emission of the laser dye solution. Generally, concentrations of from about $10^{-1}$ to $10^{-6}$ molar are employed, with solutions of from $10^{-2}$ to $10^{-5}$ molar concentrations being preferred for maximum output energies. Still wider variations in concentration can be used for particular operations, if desired.

Representative useful non-interfering solvents which do not inhibit stimulated emission are water; alkanols, including mono-, di- and polyhydric alcohols containing from one to about six carbon atoms and preferably from two to about four carbon atoms, e.g., methanol, ethanol, isopropanol, isopropanediol, butanol, etc; and aryl alcohols such as various benzene derivatives wherein the hydroxy radical is attached directly to the aryl nucleus or is attached thereto through an alkylene moiety having from one to about four carbon atoms, e.g., phenol, methylphenol, resorcinol, phenylcarbinol, methylphenylcarbinol, etc. Other solvents include fluorinated organic alcohols corresponding to the alcohols described above and discussed further in copending Drexhage application Ser. No. 149,055, filed June 1, 1971, and entitled LASER MEDIA CONTAINING FLUORINATED ALCOHOLS, also heterocyclic compounds having a nitrogen heteroatom (e.g., pyridine, 2,6-dimethylpyridine, etc), and lower alkyl ketones such as acetone. Additional useful solvents include alkyl substituted solvents such as dimethylsulfoxide, dimethylacetamide, dimethylformamide and the like as well as deuterated counterparts of various solvents such as those described above. Of course, combinations of liquids can be used as can other solvents known to be useful in the dye laser art. For example, solid host solvents can be used to form solid solutions of the dye. Acrylic or methacrylic polymers such as polymethylmethacrylate are useful for this purpose. Gelatin is another useful vehicle for lasing dyes. See O. G. Peterson and B.B. Snavely, Appl, Phys. Let., Vol. 12, p. 238, 1968; B. H. Soffer and B. B. McFarland, Appl. Phys. Let., Vol. 12, 1967; H. Kogelnick et al, Appl. Phys. Let., Vol. 16, p. 499, 1970.

The present lasing media can be used in a variety of laser apparatus. A laser structure particularly adapted for testing organic dye liquid laser media is that described by Sorokin et al, IBM Journal, (supra). For continuous operation, the present lasing media can be used in apparatus of the type described in copending application of S. A. Tuccio and O. G. Peterson, Ser. No. 117,595, filed Feb. 22, 1971 and entitled CW ORGANIC DYE LASER.

The following embodiments are included for a further understanding of the invention. Unless otherwise stated, the excitation source in the following examples is a giant pulse from a 530.0 nm. frequency doubled, neodymium glass laser. The dye lasing medium is placed in a cuvette which is located between two dielectric mirrors which form a nearly hemispherical dye laser cavity. The light from the excitation or pumping source passes through one of the dielectric mirrors into the dye-containing cuvette and along the optical axis of the cavity. A beam splitter is used to sample the output from the excitation source in order to determine the wavelength of lasing.

EMBODIMENT 1

7-Hydroxy-2', 3', 5', 6'-tetramethylspiro(acridine-9, 1'-cyclohexa-2', 5'-diene)-2(9H)-4'-dione dye is mixed together with methanol containing a few drops of $N(C_2H_5)_3$ to convert the dye to the triethyl ammonium salt thereof in a 5 cm. cuvette until a solution having an optical density of about 2.0 at 530 nanometers is obtained. The cuvette is placed between the dielectric mirrors as described above. The dye salt is found to lase at a wavelength of about 720 nm.

Embodiment 1 is repeated utilizing the dye salt described above except that in Embodiment 4 below the sodium dye salt is formed. The solvent noted above is replaced with the solvents indicated in Embodiments 2-9 below. The dye salts of Embodiments 2-9 lase at the indicated wavelength shown below.

| Embodiments 2-9 | Wavelength nm |
|---|---|
| 2. Pyridine + a few drops of $N(C_2H_5)_3$ | 734 |
| 3. Acetonitrile + a few drops of $N(C_2H_5)_3$ | 723 |
| 4. Water + a few drops of NaOH | 699 |
| 5. Trifluoroethanol + a few drops of $N(C_2H_5)_3$ | 710 |
| 6. 1 methyl-2-pyrrolidinone + a few drops of $N(C_2H_5)_3$ | 740 |
| 7. Dimethylsulfoxide + a few drops of $N(C_2H_5)_3$ | 745 |
| 8. N,N-Dimethylformamide + a few drops of $N(C_2H_5)_3$ | 740 |
| 9. Benzonitrile + a few drops of $N(C_2H_5)_3$ | 725 |

EMBODIMENT 10

Embodiment 1 is repeated except that the dye is 7-hydroxy-2'-methyl 5'-isopropylspiro(acridine-9, 1'-cyclohexa-2', 5'-diene)-2-(9H)-4'-dione. The solvent is methanol containing a few drops of $N(C_2H_5)_3$. The resultant dye salt is found to lase at about 720 nm.

EMBODIMENT 11

Embodiment 1 is repeated except that the dye salt is 9,9-dimethyl-2-dimethylamino-7H, 9H-anthracen-7-dimethyliminium nitrate. The dye salt is admixed in four different solvent mixtures and is found to lase at the wavelengths indicated below.

| Embodiments 11-14 | Wavelength nm |
|---|---|
| 11. Methanol | 660 |
| 12. Trifluoroethanol | 654 |
| 13. Hexafluoroisopropanol | 652 |
| 14. N,N-Dimethylacetamide | 671 |

The invention has been described in detail with particular reference to certain preferred embodiments thereof, but it will be understood that variations and modifications can be effected within the spirit and scope of the invention.

We claim:
1. A dye laser comprising a laser dye solution and a pumping energy source operably coupled therewith and capable of producing stimulated emission of the dye solution, said dye solution comprising a lasing concentration in a non-interfering solvent of a dye having a formula as follows:

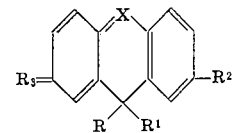

wherein:
X is a member selected from the group consisting of a nitrogen atom and the group

where $R^4$ is a member selected from the group consisting of hydrogen; a lower alkyl radical having up to about 10 carbon atoms; an aryl radical; and a lower alkoxy radical having up to about 10 carbon atoms;

R and $R^1$ each represent a member selected from the group consisting of hydrogen, an alkyl radical having up to about 15 carbon atoms, and aryl radicals; and R and $R^1$, when taken together, represent the carbon atoms necessary to complete a 6-member carbocyclic ring;

R³ represents a member selected from the group consisting of an imino radical, an oxo group, a thio radical, and an onium salt radical; and R² is a member selected from the group consisting of a di-substituted amino radical, a hydroxy radical, and a mercapto radical, with the proviso that when R³ represents an imino, oxo, or thio radical, R² is a group having the formula —T⁻ Y⁺ where Y⁺ is a cation and T is a sulfur or oxygen atom.

2. The invention as described in claim 1 wherein said dye is present in a concentration of about $10^{-2}$ to about $10^{-6}$ molar.

3. A method of producing coherent laser emission which comprises pumping a dye solution containing between about $10^{-2}$ to about $10^{-2}$ molar concentration of lasing dye in a non-interfering solvent, said dye having the following formula:

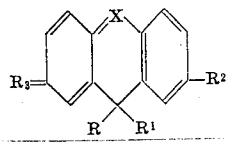

wherein:

X is a member selected from the group consisting of a nitrogen atom and the group

where R⁴ is a member selected from the group consisting of hydrogen; a lower alkyl radical having up to about 10 carbon atoms; an aryl radical; and a lower alkoxy radical having up to about 10 carbon atoms;

R and R¹ each represent a member selected from the group consisting of hydrogen, an alkyl radical having up to about 15 carbon atoms, and aryl radicals; and R and R¹, when taken together, represent the carbon atoms necessary to complete a 6-member carbocyclic ring;

R³ represents a member selected from the group consisting of an imino radical, an oxo group, a thio radical, and an onium salt radical; and R² is a member selected from the group consisting of a di-substituted amino radical, a hydroxy radical, and a mercapto radical, with the proviso that when R³ represents an imino, oxo, or thio radical, R² is a group having the formula —T⁻ Y⁺ where Y⁺ is a cation and T is a sulfur or oxygen atom.

4. The invention as described in claim 3 wherein coherent laser emission within the range of about 600 to about 800 nm. is produced and wherein said dye has the following formula:

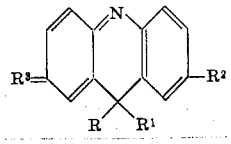

wherein:

R² and R³ are as defined in claim 3, and R and R¹ are taken together to represent the atoms necessary to complete a 6-member carbocyclic ring.

5. The invention as described in claim 3 wherein coherent laser emission within the range of about 600 to about 800 nm. is produced and wherein said dye has the following formula:

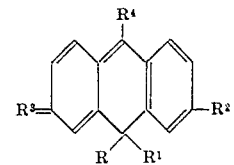

wherein:

R² and R³ are as defined in claim 3 and R and R¹ are taken together to represent the atoms necessary to complete a cyclohexadiene-4-one ring.

6. The invention as defined in claim 3 wherein coherent laser emission within the range of about 600 to about 800 nm. is produced and wherein said dye has the following formula:

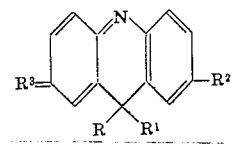

wherein:

R², R³, and R⁴ are as defined in claim 3 and wherein R and R¹ are selected from the group consisting of hydrogen, alkyl radicals, and aryl radicals.

7. The invention as defined in claim 3 wherein coherent laser emission within the range of about 600 to about 800 nm. is produced and wherein said dye has the following formula:

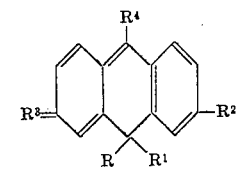

wherein:

R⁴ is a member selected from the group consisting of hydrogen and lower alkyl radicals having up to about 10 carbon atoms;

R³ is an onium salt;

R and R¹ are selected from the group consisting of hydrogen and alkyl radicals; and R² is an amino group.

8. The invention as defined in claim 3 wherein said dye is selected from the group consisting of sodium and triethyl ammonium salts of 7-hydroxy-2', 3', 5', 6'-tetramethylspiro(acridine-9, 1'-cyclohexa-2', 5'-diene)-2(9H)-4'-dione; triethyl ammonium salt of 7-hydroxy-2'-methyl 5'-isopropylspiro(acridine-9, 1'-cyclohexa-2', 5'-diene)-2-(9H)-4'-dione; 9,9-dimethyl-2-dimethylamino-7H, 9H-anthracen-7-dimethyliminium nitrate; and 7-amino-9,9-diphenyl-2(9H)-acridinylideneiminium chloride.

* * * * *

UNITED STATES PATENT OFFICE
CERTIFICATE OF CORRECTION

Patent No. 3,781,711  Dated December 25, 1973

Inventor(s) Karl H. Drexhage and George A. Reynolds

It is certified that error appears in the above-identified patent and that said Letters Patent are hereby corrected as shown below:

Column 9, line 17, "about $10^{-2}$" should read --about $10^{-6}$--.

Column 10, lines 6-12, the formula

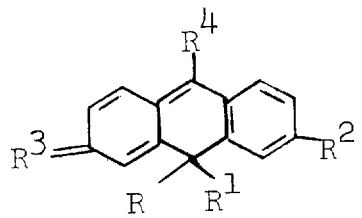 should read 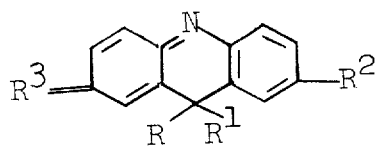

Column 10, lines 21-29, the formula

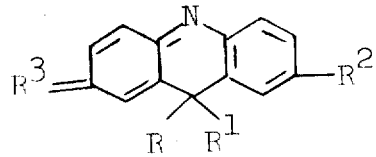 should read 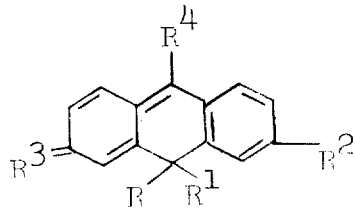

Signed and sealed this 2nd day of July 1974.

(SEAL)
Attest:

EDWARD M. FLETCHER, JR.
Attesting Officer

C. MARSHALL DANN
Commissioner of Patents